United States Patent [19]

Erwin

[11] Patent Number: 4,667,976
[45] Date of Patent: May 26, 1987

[54] TRUCK COUPLING ARRANGEMENT

[76] Inventor: Warren L. Erwin, 9906 Downey Ave., Downey, Calif. 90240

[21] Appl. No.: 789,381

[22] Filed: Oct. 21, 1985

[51] Int. Cl.$^4$ .............................................. B62D 53/08
[52] U.S. Cl. ............................ 280/438 R; 280/446 R
[58] Field of Search ........... 280/438 R, 438 A, 446 R, 280/446 A, 446 B, 438, 423 R, 423 A, 423 B

[56] References Cited

U.S. PATENT DOCUMENTS

| | | | |
|---|---|---|---|
| 1,992,164 | 2/1935 | Arner | 280/446 R X |
| 1,995,920 | 3/1935 | Gurton et al. | 280/438 R |
| 2,056,262 | 10/1936 | Edwards | 280/438 R |
| 2,680,627 | 6/1954 | Johnson et al. | 280/438 R |
| 2,681,236 | 6/1954 | Apgar | 280/440 |
| 3,796,444 | 3/1974 | Hixon | 280/483 |
| 4,359,234 | 11/1982 | Mittelstadt | 280/438 R |
| 4,438,943 | 3/1984 | Hebert | 280/446 B X |

FOREIGN PATENT DOCUMENTS 1144416 4/1957 France .............................. 280/423 A Primary Examiner—John J. Love
Assistant Examiner—Mitchell J. Hill
Attorney, Agent, or Firm—Bogucki, Scherlacher, Mok & Roth

[57] ABSTRACT

A truck coupling arrangement which couples the front of a trailer to the rear of a tractor for movement about a pivot axis locates the pivot axis back toward the rear of the tractor while at the same time maintaining the weight of the trailer and the resulting downward force on the tractor well forward and essentially centered between the dual axle rear wheels of the tractor. This has the effect of delaying the inward movement of the front of the trailer during turning of the truck, thereby improving the tracking of the trailer. The increased turning radius of the trailer reduces the need to steer the truck widely through turns in order to avoid objects at the inside of the turn. In a specific embodiment of a truck coupling arrangement, a bearing plate at the front end of a bracket pivotally mounted on the rear end of the tractor is non-rotatably coupled to the front of the trailer by a plurality of pins so that pivoting of the trailer relative to the tractor occurs at the rear end of the tractor.

9 Claims, 6 Drawing Figures

TRUCK COUPLING ARRANGEMENT

BACKGROUND OF THE INVENTION

1. Field of the Invention

The present invention relates to truck coupling arrangements for releasably coupling the front end of a trailer to the rear end of a tractor for relative pivoting movement therebetween to facilitate turning of the truck.

2. History of the Prior Art

Various conventional arrangements are known for releasably coupling the front end of a trailer to the rear end of a tractor to provide pivoting movement therebetween so that the truck may turn. In one such conventional arrangement a downwardly extending pin at the underside of the front of the trailer is received and locked within an opening in a bearing plate at the rear end of the tractor. The bearing plate or "fifth wheel" which slopes somewhat downwardly at the rear end of the tractor is typically covered with grease or other lubricant to facilitate pivoting movement along the axis of the pin of the front of the trailer relative to the rear of the tractor during turning of the truck.

A common problem with articulated vehicles such as the conventional tractor and trailer arrangement just described lies in the tendency of the front of the trailer to move relatively quickly toward the inside of the turn as the truck begins a turning movement. This results in the driver of such truck having to "swing the truck wide" during many turns to avoid striking objects at the inside of the turn. Aside from being a source of considerable inconvenience, this problem is also a substantial safety hazard in areas such as city streets where the relatively late turning movement of the tractor required at many intersections and driveways may invite autos and other smaller vehicles to advance along the inside of the truck without realizing that the truck is turning. The problem is further complicated by the considerable effort and additional space that are required to back the truck into loading docks in areas of extremely limited space that were designed years ago to accommodate smaller trucks than those presently in existence.

Truck coupling arrangements have been proposed from the more traditional designs, as exemplified by U.S. Pat. No. 4,359,234 of Mittlestadt in which the coupling between a tractor and a trailer includes a pair of pin-like pivot members that ride within the curved track of a mating member. Other examples are provided by U.S. Pat. No. 2,680,627 of Johnson et al, U.S. Pat. No. 2,056,262 of Edwards, German Pat. No. 615,163 and German Pat. No. 617,125. However, these arrangements are directed to different problems such as the provision of close-coupling of the trailer to the tractor in the case of Mittlestadt and do not address the problem of delaying the inward movement of the front of the trailer during turning while at the same time maintaining other desirable characteristics such as proper distribution of the trailor load on the tractor.

Accordingly, it would be desirable to provide an improved truck coupling arrangement for the releasable and pivotable coupling of a trailer to a tractor.

It would further be desirable to provide an improved truck coupling arrangement which improves the tracking of the trailer by delaying the inward movement of the front of the trailer during turning so as to reduce the need for wide turning movement of the tractor during many turns made by the truck.

BRIEF DESCRIPTION OF THE INVENTION

Truck coupling arrangements in accordance with the invention provide releasable and pivotable coupling of the front of a trailer to the rear of a tractor in a manner which relocates the pivot axis back toward the rear of the tractor while at the same time maintaining the downward force on the tractor at a forward location. This has the effect of delaying the inward movement of the front of the trailer during a turn, thereby improving the tracking of the trailer and providing considerably more clearance between the truck and objects located at the inside of the turn. This rearward pivot position provides for a longer portion of the trailer being forward of the pivot axis which in effect delays the front of the trailer from following the direction of the tractor in a turning movement. Thus, the longer the portion of the trailer in front of the pivot axis, the greater the delay in turning relative to the tractor.

In a preferred embodiment of a truck coupling arrangement according to the invention an elongated bracket has a rearward end thereof pivotally mounted on the rear end of the tractor. An opposite forward end of the bracket mounts a conventional bearing plate of rounded configuration and having an opening at the rear thereof which converges inwardly to a central pin-receiving opening. The central, pin-receiving opening in the bearing plate at the forward end of the bracket receives a coupling pin extending downwardly from the underside of the front end of the trailer to couple the trailer to the tractor. At the same time, rotation of the bearing plate relative to the trailer is prevented by an additional pair of pins extending downwardly from the underside of the front end of the trailer just behind the coupling pin and engaging the opposite sides of the opening at the rear of the bearing plate. This forces rotation of the trailer relative to the tractor to occur at the rear end of the tractor where the bracket is pivotably mounted, and this in turn delays inward movement of the front end of the trailer during turning movements of the truck. At the same time the cantilever action of the bracket has the effect of maintaining the weight of the forward portion of the trailer and the downward force that results therefrom at a forward location on the tractor.

In a specific example of the preferred embodiment, the bearing plate is disposed generally equidistantly between a pair of rear axles of the tractor, and the downward force exerted by the forward portion of the trailer is effectively maintained in such location in spite of locating the pivot axis well back of such location and at the rear end of the tractor.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
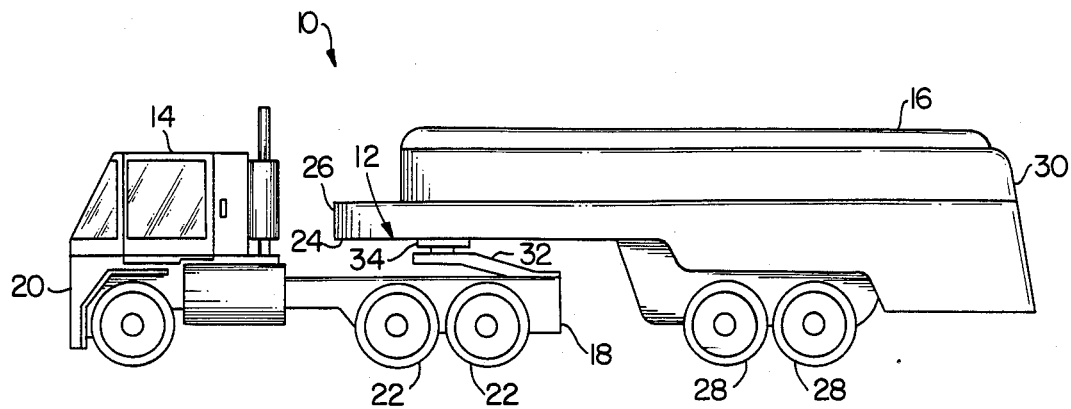
FIG. 1 is a side view of a truck employing a coupling arrangement in accordance with the invention.
Figure 2:
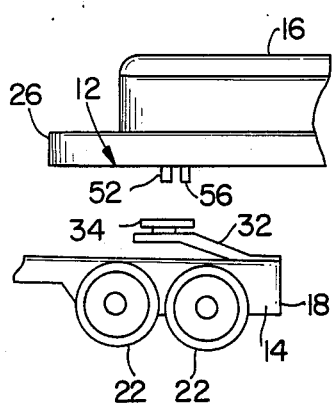
FIG. 2 is side view of the forward portion of the trailer and the rearward portion of the tractor or the truck of FIG. 1 with the trailer being separated from the tractor so as to better illustrate the coupling arrangement of the truck of FIG. 1.
Figure 3:
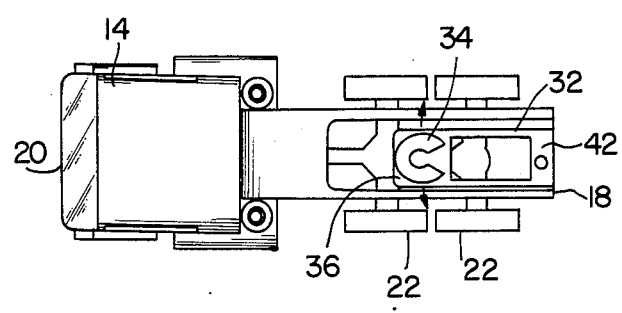
FIG. 3 is a top view of the tractor of FIG. 1 without the trailer.

FIG. 1 illustrates a truck 10 employing a coupling arrangement 12 in accordance with the invention. The truck 10 includes a tractor 14 and a trailer 16. The tractor 14 and the trailer 16 are of conventional design except for the presence of the coupling arrangement 12 according to the invention.

The coupling arrangement 12 permits pivoting movement of the tractor 14 relative to the trailer 16 during turning movement of the truck 10, and in particular relocates the pivot axis toward the rear 18 of the tractor 14 while at the same time maintaining the load on the rearward portion of the tractor 14 at a forward location. The rear 18 is located opposite a front 20 of the tractor 14 and mounts a pair of rear wheels 22 just forward thereof.

The trailer 16 has a relatively flat, downwardly facing surface 24 at a front 26 thereof. A plurality of wheels 28 are mounted just forward of an opposite rear 30 of the trailer 16.

As described hereafter the coupling arrangement 12 has the effect of moving the axis about which the trailer 16 pivots relative to the tractor 14 to the rear 18 of the tractor 14 while at the same time maintaining the effect of the loading force from the forward portion of the trailer 16 at a forward location along the rearward portion of the tractor 14. The coupling arrangement thus delays the inward movement of the front 26 of the trailer 16 during a turning movement of the truck 10.

The coupling arrangement 12 includes an elongated bracket 32 which mounts a conventional bearing plate or "fifth wheel" 34 at a front end 36 thereof. The bearing plate 34 is pivotally mounted on the front end 36 of the bracket 32 by a shaft 38 which extends across the front end 36 of the bracket 32. The shaft 38 permits the bearing plate 34 to tilt to and fro in conventional fashion. This allows the trailer 16 to tilt relative to the tractor 14 in order to accommodate non-level road surfaces.

Figure 4:
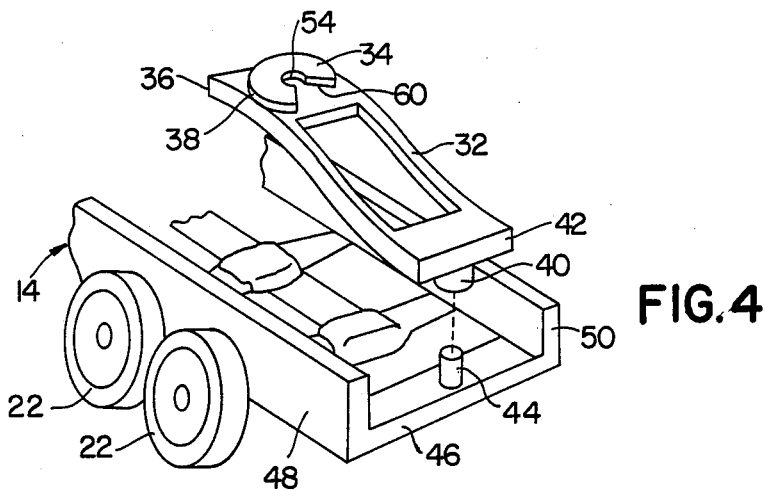
FIG. 4 is a perspective, broken-away view of the rearward portion of the trailer of FIG. 1.

The elongated bracket 32 is pivotally mounted on the tractor 14 at the rear 18 of the tractor 14. As shown in FIG. 4 a hollow, generally cylindrical element 40 mounted at the underside of a rear end 42 of the bracket 32 opposite the front end 36 receives a generally cylindrical element 44 therein. The generally cylindrical element 44 is mounted so as to extend upwardly from a cross member 46 extending between opposite side frames 48 and 50 of the tractor 14 at the rear 18 of the tractor 14. This allows the bracket 32 to swivel about a pivot axis that is defined by the central axes of the hollow, cylindrical element 40 and the cylindrical element 44.

The bearing plate 34 is coupled to the forward portion of the trailer 16 by an arrangement which prevents rotation of the bearing plate 34 relative to the trailer 16. Such arrangement includes a coupling pin 52 which extends downwardly from the bottom surface 24 of the forward portion of the trailer 16 and which is received within a central, pin-receiving opening 54 in the bearing plate 34 in conventional fashion. Such arrangement also includes a pair of pins 56 and 58 extending downwardly from the bottom surface 24 of the forward portion of the trailer 16. The pins 56 and 58 are located to the rear of and on opposite sides of the coupling pin 52. The bearing plate 34 has an opening 60 at the rear thereof. The opposite sides of the opening 60 converge from the outer edge of the bearing plate 34 to the central, pin-receiving opening 54. The pins 56 and 58 are located behind the coupling pin 52 and apart from each other by appropriate distances so as to reside against the opposite sides of the opening 60 in the bearing plate 34. This prevents the bearing plate 34 from rotating relative to the trailer 16 when the trailer 16 is coupled to the bearing plate 34.

The inability of the bearing plate 34 to rotate relative to the trailer 16 when the trailer 16 is coupled to the tractor 14 forces the trailer 16 to pivot relative to the tractor 14 above the central axis of the hollow, cylindrical element 40 and the cylindrical element 44 as the truck 10 undergoes a turning movement. Accordingly, the pivot axis between the tractor 14 and the trailer 16 is located as far back on the tractor 14 as is reasonably possible, and this acts to delay the inward movement of the forward portion of the trailer 16 as the truck 10 turns.

At the same time the effects of the load on the tractor 14 by the forward portion of the trailer 16 are maintained at a location well forward of the pivot axis defined by the hollow, cylindrical element 40 and the cylindrical element 44 because of the design of the coupling arrangement 12. The bearing plate 34 is disposed at a location above and generally equidistant between the axles of the rear wheels 22 of the tractor 14. Although the coupling arrangement 12 attaches to the tractor 14 via the hollow, cylindrical element 40 and the cylindrical element 44 which are at the rear 18 of the tractor 14, the cantilever effect of the bracket 32 produces a forward and downward movement which has the effect of applying the force resulting from the weight of the trailer 16 at a location immediately beneath the bearing plate 34 and generally equidistant between the axles of the rear wheels 26. This is desirable since the effects of the weight of the trailer 16 should be applied at or adjacent the axles of the rear wheels 22 for maximum effectiveness of the weight-supporting capacity of the rear wheels 22.

The elongated bracket 32 is curved along the length thereof so as to extend upwardly from the rear end 42 thereof to the front end 36 thereof. This provides for placement of the bearing plate 34 at a height which is appropriate for receiving the front 26 of the trailer 16. At the same time the pivoting joint provided by the hollow, cylindrical element 40 and the cylindrical element 44 immediately below the rear end 42 of the bracket 32 is at a relatively low position, which is desirable in terms of allowing maximum flexibility of the bearing plate.

Figure 5:
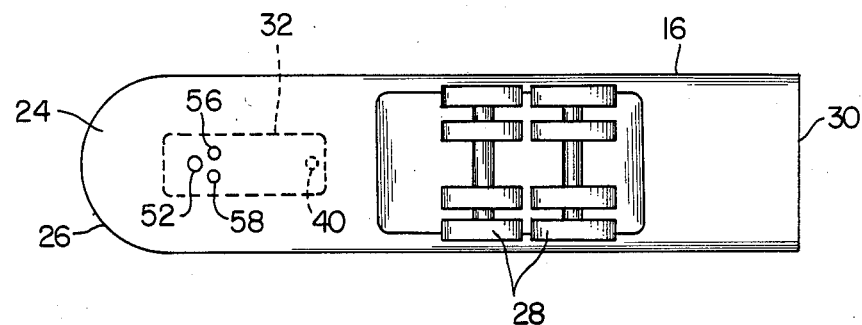
FIG. 5 is a bottom view of the trailer of FIG. 1.

The location of the elongated bracket 32 relative to the trailer 16 is depicted in dotted outline in FIG. 5. It will be seen that because of the pins 52, 56 and 58 the bracket 32 effectively becomes a rigid part of the trailer 16 when the trailer 16 is coupled to the tractor 14. This has the effect of moving the pivot axis therebetween back to the hollow, cylindrical element 40 which is also illustrated in dotted outline in FIG. 5.

Figure 6:
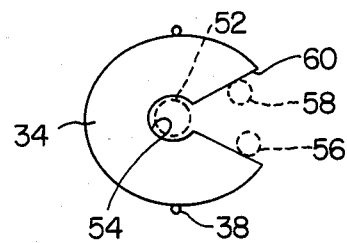
FIG. 6 is a top view of the bearing plate in the coupling arrangement of the truck of FIG. 1.

The manner in which the pins 52, 56 and 58 prevent rotation of the bearing plate 34 is illustrated in some detail in FIG. 6 in which the three different pins are illustrated in dotted outline. As shown in FIG. 6, the coupling pin 52 is received within the central, pin-receiving opening 54 in the bearing plate 34 in conventional fashion. Normally, the bearing plate 34 would be free to rotate about the coupling pin 52 and relative to the trailer 16. However, the pins 56 and 58 reside against the opposite sides of the opening 60 in the bearing plate 34 to prevent rotation of the bearing plate 34 relative to the trailer 16.

The pins 56 and 58 comprise but one example of arrangements which can be used in combination with the coupling pin 52 to prevent rotation of the elongated bracket 32 relative to the trailer 16. Alternative arrangements include a metal cleat or bar rigidly mounted on the bottom surface 24 of the trailer 16 behind the coupling pin 52 so as to extend between and engage the opposite sides of the opening 60 in the bearing plate 34 when the coupling pin 52 is received within the central, pin-receiving opening 54.

While the invention has been particularly shown and described with reference to a preferred embodiment thereof, it will be understood by those skilled in the art that various changes in form and details may be made therein without departing from the spirit and scope of the invention.

What is claimed is:

1. A truck coupling arrangement comprising a first coupling arrangement forming a portion of a tractor adjacent a rear end of the tractor opposite a front end of the tractor, a second coupling arrangement forming a portion of a trailer and being releasably coupled to the first coupling arrangement, the first and second coupling arrangements providing a generally vertical pivot axis about which the trailer pivots relative to the tractor and being designed to effectively apply a load from the trailer on the tractor at a location considerably forward of the pivot axis toward the front end of the tractor from the rear end of the tractor.

2. The invention set forth in claim 1, wherein the first coupling arrangement includes an elongated cantilevered bracket arrangement mounted on the tractor at a first end of the bracket arrangement for pivoting movement about the pivot axis and having a second end opposite the first end disposed forwardly of the first end toward the front end of the tractor from the rear end of the tractor, and the second coupling arrangement includes means mounted on the trailer for releasably and non-rotatably coupling the second end of the elongated cantilevered bracket arrangement to the trailer.

3. The invention set forth in claim 2, wherein the means mounted on the trailer for releasably and non-rotatably coupling comprises a plurality of pins extending generally downwardly from an underside of the trailer.

4. A coupling arrangement for use with a truck comprising a first coupling arrangement at the rear of a tractor and a second coupling arrangement at the front of a trailer, one of the first and second coupling arrangements including an elongated bracket mounted on the tractor at a rear end thereof for pivoting movement about a generally vertical pivot axis and extending in a forward direction relative to the tractor and the trailer and terminating in a front end opposite the rear end, and the other one of the first and second coupling arrangements including means for non-rotatably coupling the front end of the elongated bracket thereto.

5. The invention set forth in claim 4, wherein the rear end of the elongated bracket is mounted on a rear end of the tractor for pivoting movement about the generally vertical pivot axis and the means for non-rotatably coupling the front end of the elongated bracket thereto is mounted on a forward end of the trailer well forward of the rear end of the tractor relative to the tractor and the trailer.

6. A truck comprising the combination of a tractor and a trailer, the tractor having a rear portion terminating in a rear end, an elongated bracket having a rear end mounted on the rear end of the tractor for pivoting movement about a generally vertical axis, the bracket extending generally forwardly from the rear end of the tractor and terminating in a front end, a bearing plate pivotally mounted on the front end of the elongated bracket for pivoting movement about a generally horizontal axis, and apparatus mounted on the trailer and adapted to engage and releasably and non-rotatably couple the bearing plate to the trailer.

7. A truck comprising the combination of a tractor and a trailer, the tractor having a rear portion terminating in a rear end, an elongated bracket having a rear end pivotally mounted on the rear end of the tractor, the bracket extending generally forwardly from the rear end of the tractor and terminating in a front end, a bearing plate pivotally mounted on the front end of the elongated bracket for pivoting movement about a generally horizontal axis, and apparatus mounted on the trailer and adapted to engage and releasably and non-rotatably couple the bearing plate to the trailer, the apparatus mounted on the trailer including a plurality of pins, the bearing plate having a central, pin-receiving opening therein and a further opening at a rear edge thereof, and the plurality of pins including a coupling pin adapted to be received within the pin-receiving opening in the bearing plate and an additional pair of pins adapted to reside against opposite sides of the further opening in the bearing plate when the coupling pin is received within the pin-receiving opening.

8. A truck comprising the combination of a tractor and a trailer, the tractor having a rear portion terminating in a rear end, an elongated bracket having a rear end pivotally mounted on the rear end of the tractor, the bracket extending generally forwardly from the rear end of the tractor and terminating in a front end, a bearing plate pivotally mounted on the front end of the elongated bracket for pivoting movement about a generally horizontal axis, and apparatus mounted on the trailer and adapted to engage and releasably and non-rotatably couple the bearing plate to the trailer, the tractor including at least one rear wheel axle mounted thereon at a location forward of the rear end of the tractor, and the bearing plate is disposed immediately above the at least one rear wheel axle with the bracket extending generally forwardly from the rear end of the tractor.

9. A truck comprising the combination of a tractor and a trailer, the tractor having a rear portion terminating in a rear end, an elongated bracket having a rear end pivotally mounted on the rear end of the tractor, the bracket extending generally forwardly from the rear end of the tractor and terminating in a front end, a bearing plate pivotally mounted on the front end of the elongated bracket for pivoting movement about a generally horizontal axis, and apparatus mounted on the trailer and adapted to engage and releasably and non-rotatably couple the bearing plate to the trailer, the elongated bracket rising along the length thereof from the rear end thereof to the front end thereof.

* * * * *